United States Patent
Close et al.

(10) Patent No.: US 12,200,369 B2
(45) Date of Patent: Jan. 14, 2025

(54) METHOD AND SYSTEM FOR MITIGATING IMAGE FLICKER FROM STROBED LIGHTING SYSTEMS

(71) Applicant: JAGUAR LAND ROVER LIMITED, Coventry (GB)

(72) Inventors: Joshua Close, Coventry (GB); Alexander Pryke, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 293 days.

(21) Appl. No.: 17/640,007

(22) PCT Filed: Sep. 3, 2020

(86) PCT No.: PCT/EP2020/074577
§ 371 (c)(1),
(2) Date: Mar. 3, 2022

(87) PCT Pub. No.: WO2021/043892
PCT Pub. Date: Mar. 11, 2021

(65) Prior Publication Data
US 2022/0329723 A1 Oct. 13, 2022

(30) Foreign Application Priority Data

Sep. 3, 2019 (GB) ...................................... 1912625
Sep. 3, 2019 (GB) ...................................... 1912631

(51) Int. Cl.
*H04N 23/745* (2023.01)
*B60R 1/12* (2006.01)
(Continued)

(52) U.S. Cl.
CPC ............. *H04N 23/745* (2023.01); *B60R 1/12* (2013.01); *B60R 1/26* (2022.01); *B60R 11/04* (2013.01);
(Continued)

(58) Field of Classification Search
CPC ...... H04N 23/745; H04N 23/73; H04N 23/90; B60R 1/26; B60R 1/12; B60R 11/04;
(Continued)

(56) References Cited

U.S. PATENT DOCUMENTS 9,969,332 B1 5/2018 Pertsel et al.
2015/0312464 A1 10/2015 Peng
(Continued)

OTHER PUBLICATIONS

Combined Search and Examination report corresponding to Great Britain Application No. GB1912631.7, Feb. 19, 2020, 5 pages.
(Continued)

*Primary Examiner* — Joel W Fosselman
(74) *Attorney, Agent, or Firm* — Reising Ethington P.C.

(57) ABSTRACT

Aspects of the present invention relate to an image correction system (300) for mitigating image flicker from strobed lighting systems. The image correction system (300) comprises one or more controllers (120) comprising input means (122), processing means (121) and output means (122). The input means (122) is configured to receive, from a first imaging apparatus (111) comprising a first pixel array configured to operate with at least a first exposure time, first image data (141) indicative of an environment. The input means (122) are configured to receive, from a second imaging apparatus (112) comprising a second pixel array configured to operate with at least a second exposure time different to the first exposure time, second image data (142) indicative of at least a portion of the environment. The processing means (121) are configured to identify strobed lighting regions of the first image data (141) and strobed lighting regions of the second image data (142); and to determine corrected image data for mitigating image flicker of the strobed lighting regions of the first image data (141) in dependence on a correspondence between the strobed lighting regions of the first image data (141) and the strobed
(Continued)

lighting regions of the second image data (142). The output means (122) is configured to output a signal indicative of the corrected image data.

18 Claims, 10 Drawing Sheets

(51) Int. Cl.
  *B60R 1/26* (2022.01)
  *B60R 11/00* (2006.01)
  *B60R 11/04* (2006.01)
  *H04N 23/73* (2023.01)
  *H04N 23/90* (2023.01)

(52) U.S. Cl.
  CPC ............ *H04N 23/73* (2023.01); *H04N 23/90* (2023.01); *B60R 2001/1215* (2013.01); *B60R 2001/1253* (2013.01); *B60R 2011/004* (2013.01); *B60R 2300/105* (2013.01); *B60R 2300/30* (2013.01); *B60R 2300/8046* (2013.01)

(58) Field of Classification Search
  CPC .... B60R 2001/1215; B60R 2001/1253; B60R 2011/004; B60R 2300/105; B60R 2300/30; B60R 2300/8046

USPC ...................................................... 348/228.1
  See application file for complete search history.

(56) References Cited

U.S. PATENT DOCUMENTS

| | | |
|---|---|---|
| 2016/0373684 A1 | 12/2016 | Sherman et al. |
| 2017/0041591 A1 | 2/2017 | Korogi et al. |
| 2017/0339326 A1 | 11/2017 | Rycenga et al. |
| 2018/0041684 A1* | 2/2018 | Hilldore .................... B60R 1/00 |
| 2018/0106613 A1 | 4/2018 | Iwakura et al. |
| 2018/0324344 A1* | 11/2018 | Kinoshita ............. H04N 23/76 |
| 2018/0336692 A1 | 11/2018 | Wendel et al. |
| 2019/0058823 A1* | 2/2019 | Dewhurst ............ H04N 23/741 |
| 2019/0149711 A1 | 5/2019 | Okuike |

OTHER PUBLICATIONS

International Search Report corresponding to International Application No. PCT/EP2020/074577, dated Nov. 24, 2020, 5 pages.
Written Opinion corresponding to International Application No. PCT/EP2020/074577, dated Nov. 24, 2020, 7 pages.

* cited by examiner

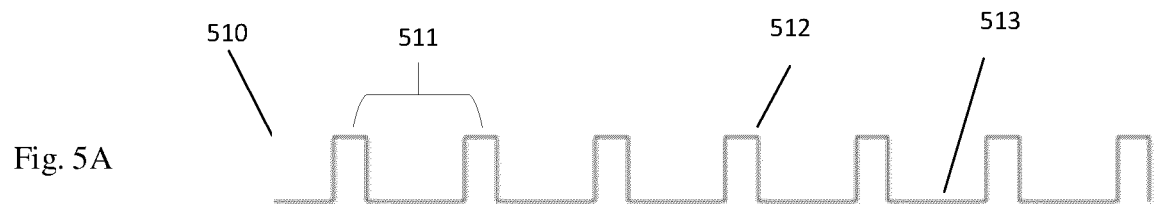
Fig. 5A
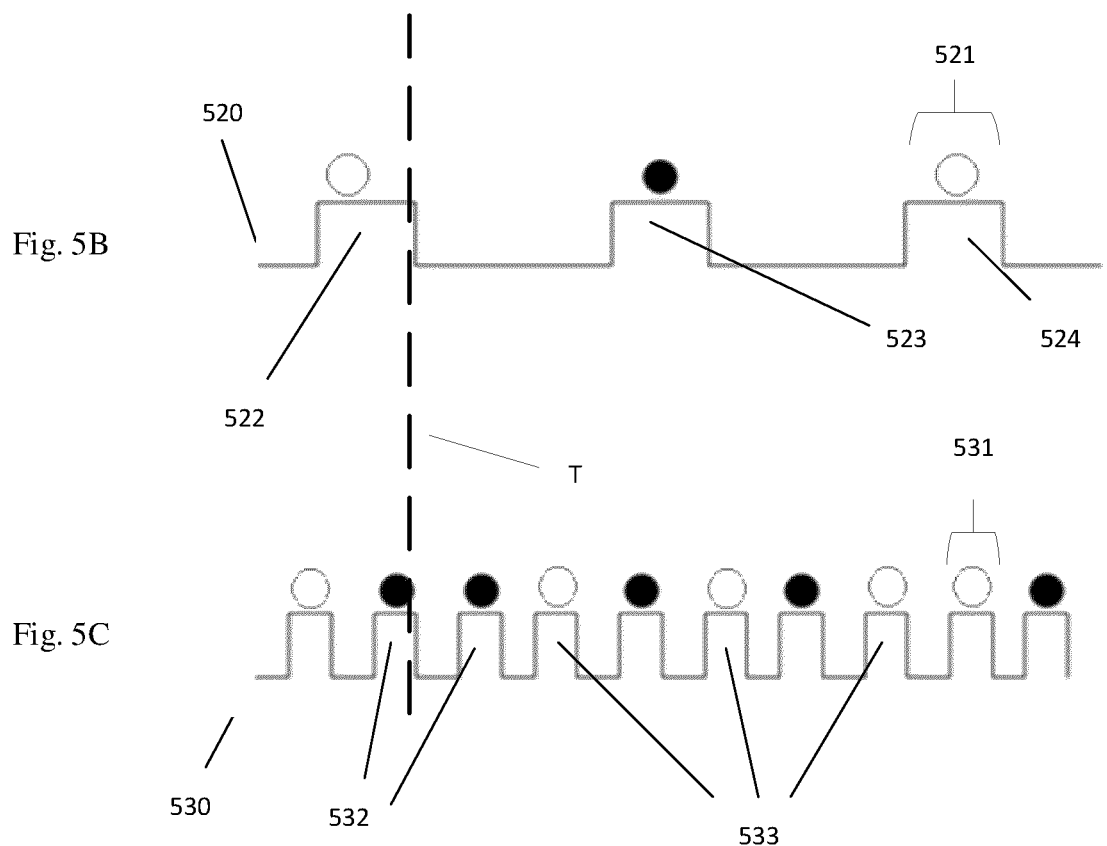
Fig. 5B
Fig. 5C

METHOD AND SYSTEM FOR MITIGATING IMAGE FLICKER FROM STROBED LIGHTING SYSTEMS

TECHNICAL FIELD

The present disclosure relates to mitigating image flicker from strobed lighting systems. Aspects of the invention relate to a controller, a system, a vehicle, a method and a computer-readable medium comprising computer readable instructions.

BACKGROUND

It is known to provide image processing techniques to mitigate light emitter flicker in image data. Light emitters, for example LEDs, are controlled to emit light in a series of pulses. The pulses are typically high frequency and thus not perceivable to a human observer. When a camera captures image data of a scene, the image data comprises a series of frames each exposed for an exposure time at short intervals, for example at a frequency of 30 to 60 frames per second. If the camera frequency and light emitter frequency are not synchronised when a light emitter is captured in the scene, the lack of synchronisation can cause the light emitter to visibly appear flashing to an observer when the image data is reproduced, a problem which may be referred to as image flicker.

Known image flicker algorithms may identify areas of image data subject to flicker and address the issue by adjusting one or more exposure times of the camera to align with the light emitter frequency. Processing image frames in this way to identify and remove flicker caused by the light emitter can be resource intensive. Furthermore, by adjusting one or more exposure times of the camera to align with the light emitter frequency, the one or more adjusted exposure times are no longer configured to best capture the overall scene. Therefore, dynamic range of the camera and thus image quality of the image data may be compromised. Such an issue may be particularly prevalent for high dynamic range (HDR) cameras.

It is an aim of the present invention to address one or more of the disadvantages associated with the prior art.

SUMMARY OF THE INVENTION

Aspects and embodiments of the invention provide a system, a vehicle and a method for identifying light emitter flicker as claimed in the appended claims.

According to an aspect of the present invention there is provided a system for identifying light emitter flicker, the system comprising one or more controllers, the one or more controllers configured to receive image data and data indicative of illumination objects, the one or more controllers comprising processing means configured to identify strobed lighting regions of image data corresponding to one or more of the illumination objects.

According to an aspect of the present invention there is provided a system for identifying light emitter flicker, the system comprising one or more controllers, the one or more controllers comprising input means configured to receive environment data indicative of objects in an environment and to receive, from one or more imaging devices, image data indicative of at least a portion of the environment; processing means configured to identify, in dependence on the environment data, one or more of the objects as illumination objects associated with a strobed lighting system, and to determine one or more strobed lighting regions of the image data corresponding to the one or more illumination objects; and output means configured to output a signal indicative of the one or more strobed lighting regions.

Advantageously, the system may identify areas of image data likely to exhibit image flicker, such that image correction algorithms may be selectively applied to the identified areas thus enabling increased efficiency of image correction.

Optionally, the system comprises an image correction controller configured to receive the image data and the signal indicative of the one or more strobed lighting regions; apply an image correction operation for mitigating image flicker to the one or more strobed lighting regions of the image data to determine corrected image data; and output a signal indicative of the corrected image data. Optionally, the system may comprise a display device configured to receive the corrected image data and to display an indication of the corrected image data. The system is optionally associated with a vehicle, and wherein the environment data is indicative of objects in the environment proximal to the vehicle. Optionally, the one or more imaging devices comprise one or more cameras associated with the vehicle. The environment data may be indicative of data received from one or more sensors associated with the vehicle. The sensors may comprise one or more of: a lidar sensor associated with the vehicle, a radar sensor associated with the vehicle, a sensor associated with a Park Distance Control system of the vehicle, and a camera associated with the vehicle.

The environment data may comprise map data indicative of one or more navigable paths in the environment. Optionally, the map data is indicative of one or more strobed light emitters in the environment. Optionally, the one or more strobed light emitters comprise signage associated with at least some of the navigable paths. Optionally, the input means comprises one or more electrical inputs for receiving the environment data and image data; the processing means comprises one or more electronic processors; and the output means comprises one or more electrical outputs for outputting the signal.

According to an aspect of the present invention there is provided a vehicle comprising a system for identifying light emitter flicker according to the above statements.

According to an aspect of the present invention there is provided a computer-implemented method for identifying light emitter flicker, the method comprising: receiving environment data indicative of objects in an environment; identifying, in dependence on the environment data, one or more of the objects as illumination objects associated with a strobed lighting system; receiving image data indicative of at least a portion of the environment; determining one or more strobed lighting regions of the image data corresponding to the one or more illumination objects; and outputting a signal indicative of the one or more strobed lighting regions.

Optionally, the method comprises applying an image correction operation to the one or more strobed lighting regions to determine corrected image data; and outputting a signal indicative of the corrected image data. The method may optionally comprise displaying an indication of the corrected image data.

According to an aspect of the present invention there is provided a non-transitory computer readable medium comprising computer readable instruction that, when executed by a processor, cause performance of the above method.

According to an aspect of the present invention there is provided an image correction system for mitigating image flicker from strobed lighting systems, the image correction system comprising one or more controllers, the one or more controllers comprising input means configured to receive first image data from a first imaging apparatus and second image data from a second imaging apparatus, the one or more controllers comprising processing means configured to determine corrected image data for mitigating image flicker of the first image data in dependence on a correspondence between the first image data and the second image data.

According to an aspect of the present invention there is provided an image correction system for mitigating image flicker from strobed lighting systems, the image correction system comprising one or more controllers, the one or more controllers comprising input means configured to receive, from a first imaging apparatus comprising a first pixel array configured to operate with at least a first exposure time, first image data indicative of an environment; the input means configured to receive, from a second imaging apparatus comprising a second pixel array configured to operate with at least a second exposure time different to the first exposure time, second image data indicative of at least a portion of the environment; processing means configured to identify strobed lighting regions of the first image data and strobed lighting regions of the second image data; the processing means configured to determine corrected image data for mitigating image flicker of the strobed lighting regions of the first image data in dependence on a correspondence between the strobed lighting regions of the first image data and the strobed lighting regions of the second image data; and output means configured to output a signal indicative of the corrected image data.

Advantageously, image flicker within the first image data may be mitigated in real-time without the need to adjust an exposure time of the first imaging device to account for the strobe rate of the strobed light emitter. Thus, dynamic range and image quality of the first image data are preserved.

Optionally, the system comprises a display device configured to receive the signal indicative of the corrected image data and to display an indication of the signal. The processing means may be arranged to determine the corrected image data in real-time. The system may optionally comprise the first imaging apparatus comprising the first pixel array configured to generate the first image data; and the second imaging apparatus comprising the second pixel array configured to generate the second image data.

The second imaging apparatus may be configured to adjust an exposure time of the second pixel array to at least a third exposure time, and to generate at least a portion of the second image data at each of the second and third exposure times. The one or more controllers may be optionally configured to identify a contrast between pixel values of corresponding regions of the second image data generated at the second and third exposure times, and to identify the strobed lighting regions in dependence thereon. Optionally, the one or more controllers are configured to determine a strobe rate of the strobed lighting region. The one or more controllers may be configured to communicate an indication of the strobe rate to the second imaging apparatus, and to control the second imaging apparatus to adjust at least one of the second or third exposure time to align with the strobe rate. The second imaging apparatus may be configured to communicate the second image data generated at the at least one adjusted exposure time to the one or more controllers.

The one or more controllers are optionally configured to determine the corrected image data by substituting at least some of the strobed lighting regions of the first image data with the corresponding strobed lighting regions of the second image data.

Optionally, the one or more controllers are configured to identify a contrast between pixel values of corresponding regions of the first image data and the second image data, and to identify the strobed lighting regions in dependence thereon.

The one or more controllers may be configured to determine a corrected pixel value for each of the strobed lighting regions in dependence on the identified contrast. Optionally, the one or more controllers are configured to determine the corrected image data by adjusting each strobed lighting region of the first image data to maintain the corrected pixel value. Optionally, the first imaging apparatus comprises a High Dynamic Range, HDR, camera.

The image correction system may optionally be associated with a vehicle. The first image data and second image data may be indicative of objects in the environment proximal to the vehicle. Proximal may optionally be defined as within a line of sight of the vehicle Optionally, the first imaging apparatus and the second imaging apparatus each comprise one or more cameras associated with the vehicle.

The first imaging apparatus may be associated with a rear view system of the vehicle. Optionally, the display device may comprise one or both of a rear view mirror replacement system or a door mirror replacement system. Optionally, the image correction system is a rear view mirror or door mirror replacement system.

The second imaging apparatus may be associated with an existing vehicle system and is arranged to be utilised for one or more additional purposes besides image correction.

The input means optionally comprises one or more electrical inputs for receiving the first image data and second image data. The processing means optionally comprises one or more electronic processors. The output means optionally comprises one or more electrical outputs for outputting the signal. Optionally, the image correction system may comprise one or more components of the system for identifying light emitter flicker.

According to an aspect of the present invention, there is provided a vehicle comprising the image correction system.

According to an aspect of the present invention, there is provided an image correction method for mitigating image flicker from strobed lighting systems, the image correction method comprising: receiving first image data indicative of an environment taken with at least a first exposure time; receiving second image data indicative of at least a portion of the environment taken with at least a second exposure time different to the first exposure time; identifying strobed lighting regions of the first image data and the second image data; determining corrected image data for mitigating image flicker of the strobed lighting regions of the first image data in dependence on a correspondence between the strobed lighting regions of the first image data and the strobed lighting regions of the second image data; and outputting a signal indicative of the corrected image data.

Optionally, the image correction method may be applied to the one or more identified strobed lighting regions.

According to an aspect of the present invention, there is provided a non-transitory computer readable medium comprising computer readable instruction that, when executed by a processor, cause performance of the image correction method.

The one or more controllers collectively comprise at least one electronic processor having an electrical input for receiving first image data indicative of an environment or environment data indicative of objects in an environment and at least one memory device electrically coupled to the at least one electronic processor and having instructions stored therein and wherein the at least one electronic processor is configured to access the at least one memory device and execute the instructions thereon so as to output a signal indicative of the corrected image data or the one or more strobed lighting regions.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 5 shows an illustration of example light emitter flicker according to an embodiment of the invention;

DETAILED DESCRIPTION

Figure 1:
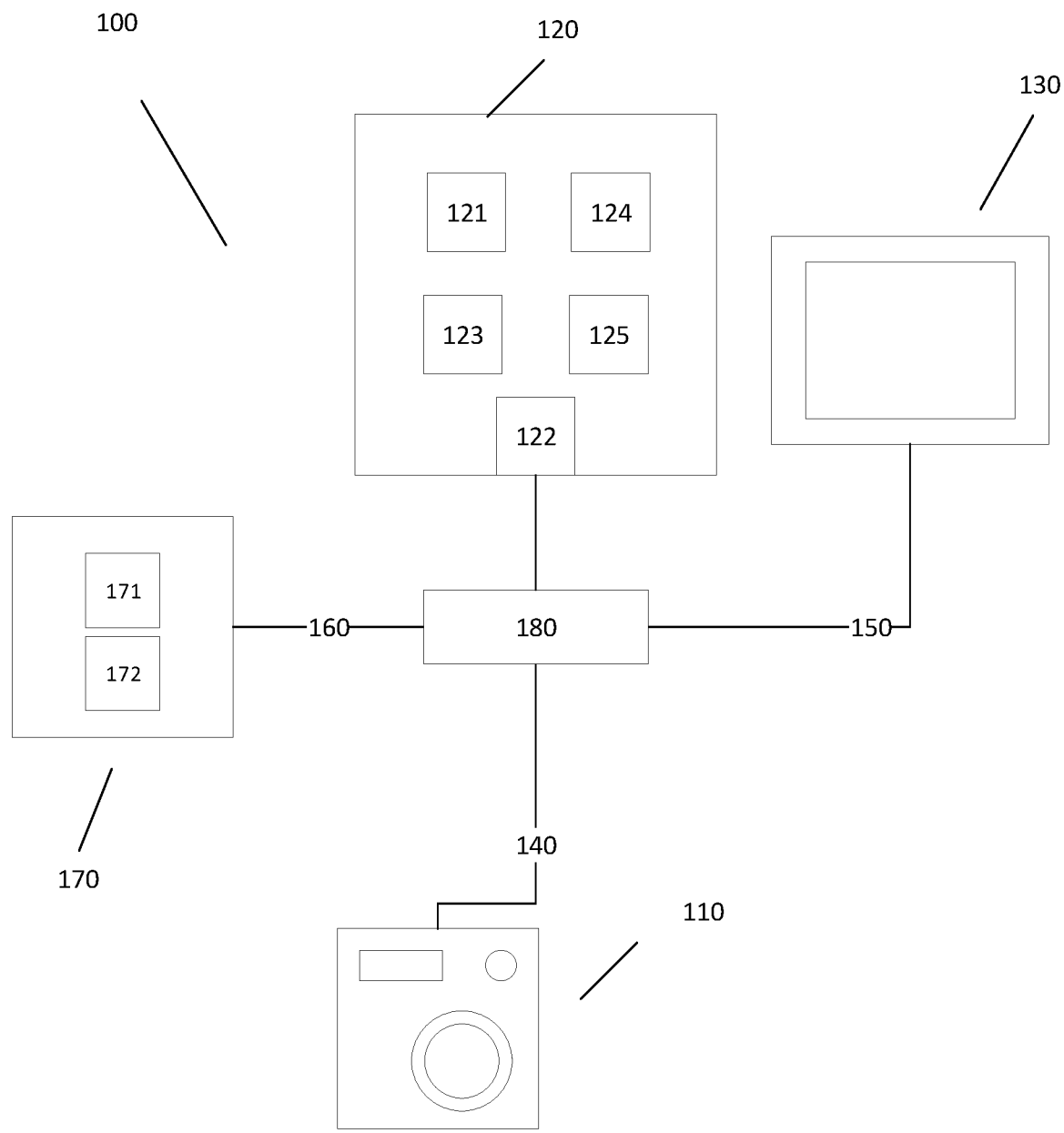
FIG. 1 shows a schematic diagram illustrating an imaging system according to an embodiment of the invention.

Embodiments of the present invention relate to the identification and mitigation of light emitter flicker for an imaging system. An imaging system 100 which may be configured to identify or mitigate light emitter flicker in accordance with various embodiments of the present invention is described herein with reference to the accompanying FIG. 1.

The imaging system 100 may be configured to generate image data 140 indicative of an environment. Embodiments of the present invention relate to the identification and mitigation of light emitter flicker in the image data 140 generated by the imaging system 100. According to some embodiments, the imaging system may be associated with a vehicle as will be explained, and the environment may comprise surroundings of the vehicle. For example, the environment may comprise surroundings within a line of sight of the vehicle. Embodiments of the present invention will be described with reference to the imaging system 100 being associated with a vehicle and the environment comprising the vehicle surroundings, although it will be appreciated that the imaging system 100 is not limited to vehicular implementation. For example, in other embodiments the imaging system 100 may be implemented in a mobile device or other computing apparatus, and the environment may comprise the surroundings of the imaging system 100.

The imaging system 100 comprises imaging means 110 configured to generate the image data 140. The imaging means 110 may comprise one or more imaging devices. For example, the imaging means 110 may comprise at least one camera comprising one or more lenses and an image capture mechanism. The at least one camera may be associated with the vehicle, for example the at least one camera may be integrated with the vehicle and configured to generate image data 140 indicative of at least a portion of the vehicle surroundings. The imaging means 110 may be communicably coupled to one or more communication networks 180 and may be arranged to communicate the image data 140 via the one or more communication networks 180. In some embodiments the communication networks 180 may comprise a wireless network such as Wi-Fi, Bluetooth or Infrared communication and/or may comprise one or more wired networks. In some embodiments the one or more communication networks 180 may comprise a vehicle communication network 180, for example a vehicle bus or network, which may be implemented as FlexRay, CAN or TTP, for example.

The imaging system 100 comprises a control means 120 in the form of a controller 120 according to an embodiment of the invention. The controller 120 comprises processing means 121, communication means 122 and data storage means 123. The communication means 122 is communicably coupled, in use, to the one or more communication networks 180, and thus the controller 120 is communicable with, in use, the imaging means 110. In some embodiments, communication means 122 may comprise an input means and an output means. For example the communication means 122 may comprise one or more electrical inputs for receiving input data from the one or more communication networks. The communication means 122 may comprise one or more electrical outputs for communicating output data from the controller 120 to other components of the imaging system 100. The communication means 122 may be arranged to receive the image data 140 from the imaging means 110.

The data storage means 123 is formed by one or more data storage devices such as memory devices. The data storage means 123 may be configured to store the image data 140 for use by the processing means 121. The processing means 121 may be provided in the form of one of more processing devices for operatively executing computer-executable instructions, wherein the instructions may be stored in a computer-readable medium, such as the data storage means 123. The computer-executable instructions may comprise a light emitter flicker identification module (LIM) 124 and an image correction module (ICM) 125. The processing means 121 may be arranged to process the image data 140 to determine display data 150, as will be explained. In some embodiments the LIM 123 may be arranged to identify regions of light emitter flicker in the image data 140. In some embodiments, the ICM 125 may be arranged to correct, or reduce, light emitter flicker in the image data 140 and to determine the display data 150. The communication means 122 may be arranged to communicate the display data 150 via the one or more communication networks 180.

The imaging system 100 comprises a display device 130 communicable, in use, with the one or more communication networks 180. The display device 130 is configured to receive the display data 150 and to display a representation of the display data 150 to a user of the imaging system 100. In some embodiments the display device 130 may for example comprise a display screen such as one or more of an LED, PDP or LCD display. The display device 130 may be arranged in the vehicle, for example to display a representation of the display data 150 to a driver or passenger of the vehicle.

In some embodiments the imaging system 100 may comprise an environment determination means (EDM) 170. The environment determination means 170 may be configured to determine environment data 160 indicative of the environment, for example indicative of the surroundings of the vehicle. The EDM 170 may be configured to communicate the environment data 160 to the controller 120 via the one or more communication networks 180. The EDM 170 may comprise one or more environment determination devices 171 operable to identify or map the environment. The one or more environment determination devices 171 may be configured to generate data indicative of the location of one or more objects in the environment. The environment determination devices 171 may comprise one or more sensors associated with the vehicle, such as one or more of a lidar sensor associated with the vehicle, a radar sensor associated with the vehicle, a sensor associated with a Park Distance Control system of the vehicle, and one or more cameras associated with the vehicle. Each of the environment determination devices 171 may be associated with an existing vehicle system, for example associated with a parking control system or adaptive cruise control system as two illustrative examples.

The EDM 170 may comprise map data means 172. The map data means 172 provides digital map data. As will be appreciated, digital map data is data indicative of navigable paths or routes in the environment, where the navigable paths may be in the form of roads, although other paths such as vehicle-accessible tracks or areas such as car parks and the like may also be included in the map data. The digital map data may, in some embodiments, comprise horizon data or electronic-horizon data (e-horizon data) which includes data indicative of one or more objects and the location of the one or more objects in the environment. For example the map data be indicative of a type and a location of one or more strobed light emitters in the environment. The one or more strobed light emitters may comprise signage or other fixtures associated with the navigable paths, for example street signs, traffic lights or other road lighting systems. The map data means 172 may be formed by one or more data storage devices, such as memory devices, having the digital map data stored therein. However in other embodiments the digital map means 172 may provide access to remotely stored digital map data accessible on a server or cloud storage via a communications link.

The EDM 170 may be configured to determine the environment data 160 in dependence on a combination of data determined by the one or more environment determination devices 171 and the map data means 172. The environment data 160 may comprise information indicative of a plurality of objects identified by the one or more environment determination devices 171 and map data means 172, for example a label indicating each object type, and a location of each of the identified objects in the environment.

Figure 2:
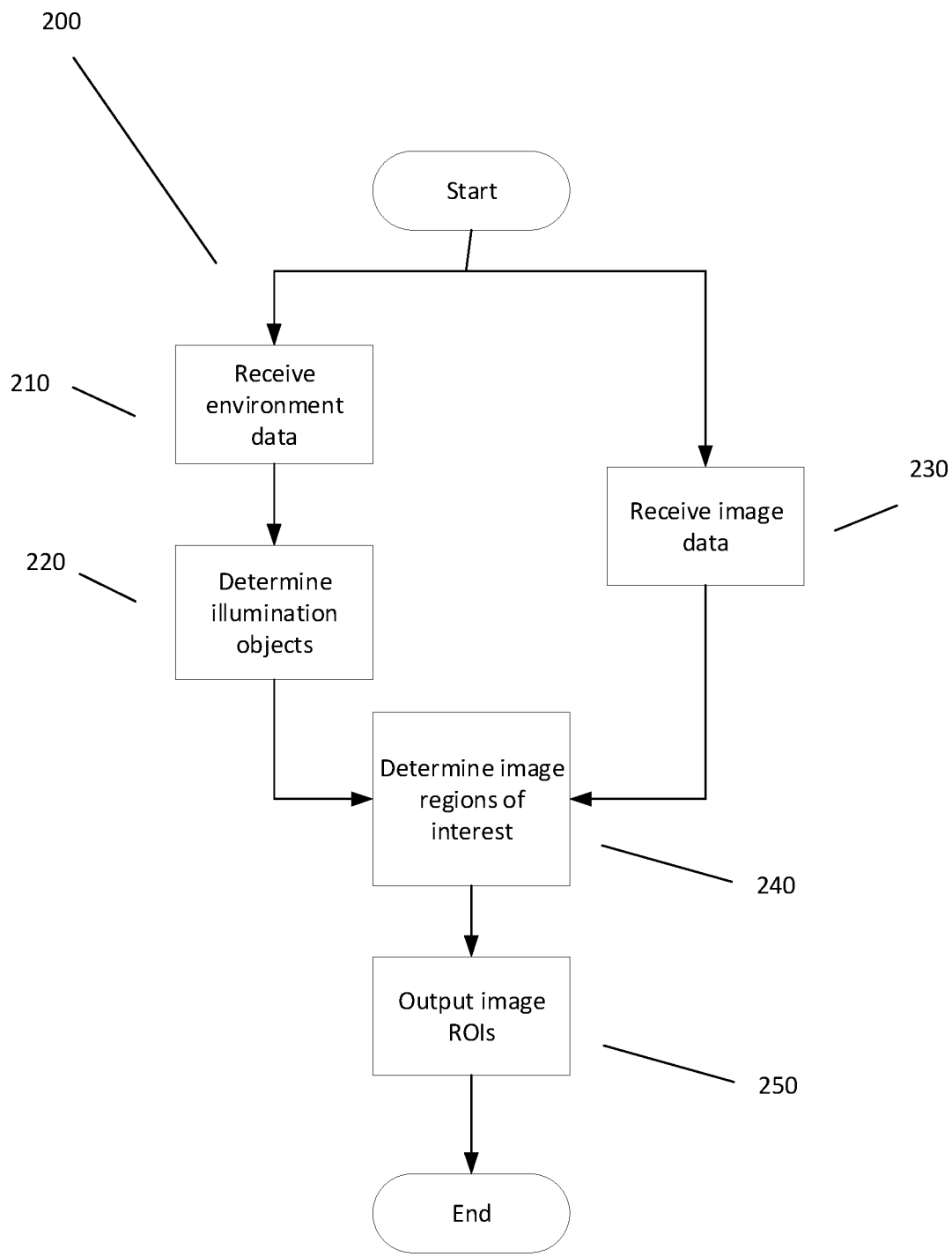
FIG. 2 shows a method for identifying light emitter flicker regions according to an embodiment of the invention.

According to some embodiments of the present invention there is provided a method for identifying light emitter flicker, described herein with reference to the accompanying FIG. 2. In particular, there is provided a method for identifying one or more relevant areas of image data likely to be subject to light emitter flicker. Flicker mitigation algorithms may be directed to the relevant areas of image data. Advantageously, directing the flicker mitigation algorithms to the relevant areas reduces power consumption when processing image data for display, as will be explained.

FIG. 2 illustrates a method 200 for identifying light emitter flicker according to an embodiment of the present invention. The method 200 may be performed on components of the imaging system 100, for example the method 200 may be implemented by the LIM 123 and other components of the controller 120.

The method 200 comprises a step 210 of receiving the environment data 160 at the controller 120. The environment data 160 may be received from the EDM 170. The environment data 160 is indicative of a plurality of objects in the environment, as has been described with reference to FIG. 1.

The method 200 comprises a step 220 of identifying one or more illumination objects in the environment data 160. Step 220 may be performed by the LIM 123. Step 220 may comprise identifying a subset of the objects in the environment data 160 as strobed light emitters. In some embodiments, an indication of whether each of the objects is a strobed light emitter may be associated with such as embedded in the environment data 160. In some embodiments, an indication of a set of object types likely to be strobed light emitters may accessible by the LIM 123, for example stored on the data storage means 123 or accessible via the one or more communication networks 180. An example set of object types is illustrated below.

| Strobed light emitters |
| --- |
| Street sign |
| Traffic light |
| Car headlight |
| Street lamp |
| Gantry sign |

Figure 9:
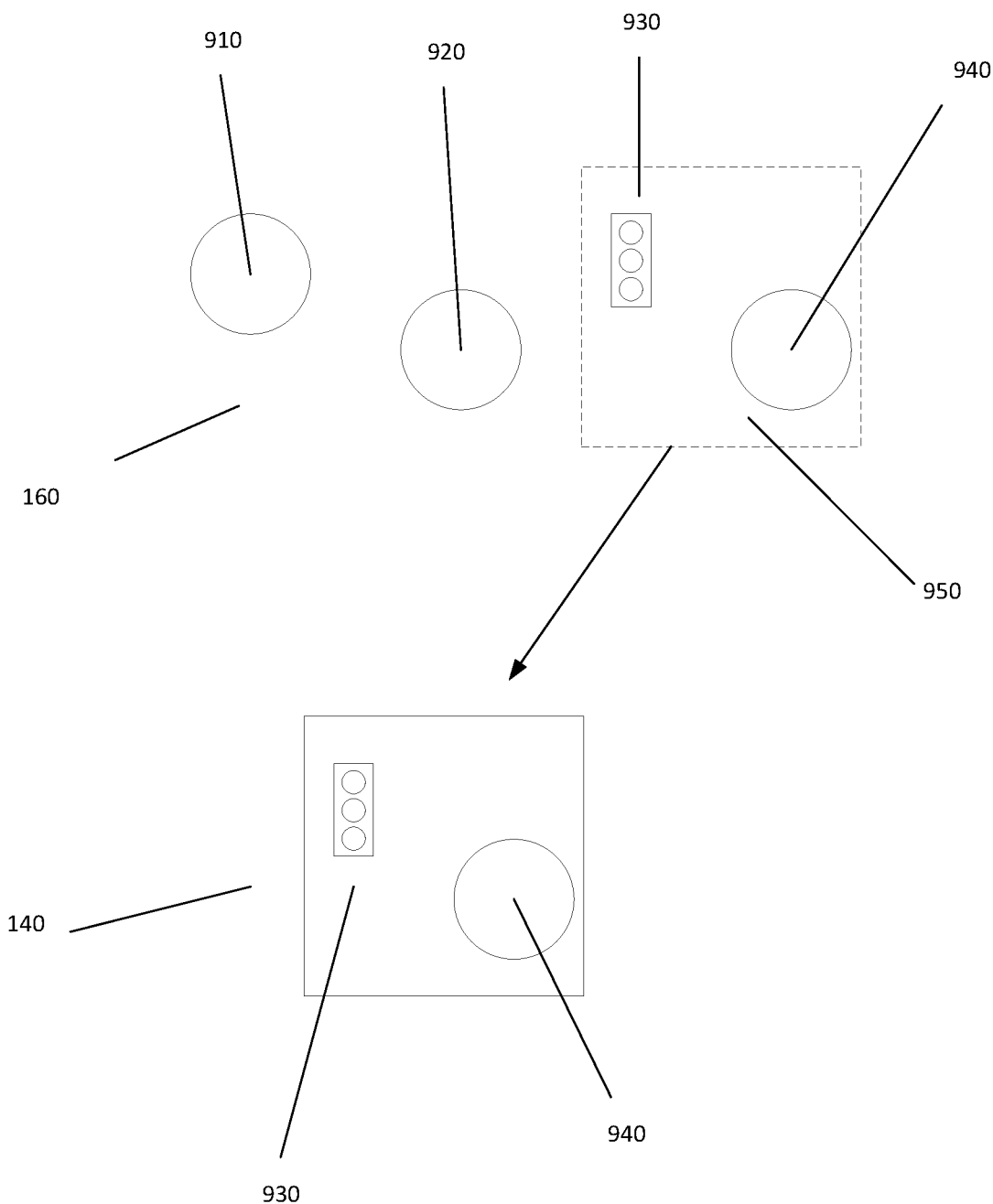
FIG. 9 shows an illustration of environment data and corresponding image data according to an embodiment of the invention.

It will be appreciated that the above list is merely illustrative, and the set of strobed light emitters may be predetermined and comprise other object types. The step 220 may comprise identifying an object type in the environment data 160 as an illumination object if the object type is indicated in the set of strobed light emitters. For example, FIG. 9 illustrates example a representation of environment data 160 indicative of the locations of a plurality of objects 910, 920, 930, 940 in the environment. Object 930 may be labelled or associated with the object type 'Traffic light' in the environment data 160. As the object type 'Traffic light' is indicated in the set of strobed light emitters, step 220 of the method 200 may comprise identifying the object 930 as an illumination object.

The method 200 comprises a step 230 of receiving image data, for example the image data 140. In some embodiments, the image data 140 is generated by the imaging means 110 and received by the controller 120 via the one or more communication networks 180 as has been described with reference to FIG. 1. The image data 140 may be indicative of at least a portion of the environment associated with the environment data 160.

The method 200 comprises a step 240 of determining image regions of interest. Step 240 may comprise determining one or more strobed lighting regions of the image data 140 corresponding to the locations of the one or more illumination objects.

The one or more strobed lighting regions of the image data may be determined in dependence on correspondence data indicative of a correspondence between the image data 140 and the environment data 160. The correspondence may be defined as a mapping or relationship between the image data 140 and the environment. The image data 140 is indicative of a portion of the environment, wherein the portion may be defined by a field of view of the imaging means 110. The image data 140 therefore corresponds to a portion 950 of the environment data 160, as illustrated in FIG. 9. Thus, the image data 140 may indicate a subset 930, 940 of the plurality of objects which are within the field of view of the imaging means 110. The correspondence data may be predetermined and stored in the data storage means 123. For example, the correspondence data may be indicative of the field of view of the imaging means 110 and stored as a consequence of a configuration of the imaging means 110. Alternatively or additionally, the correspondence data may be determined by the processing means 121 by for example comparing features of the image data 140 and the environment data 160. In step 240, the correspondence data may be utilised to identify one or more strobed lighting regions of the image data 140. The one or more strobed lighting regions of the image data 140 may comprise regions corresponding to any of the illumination objects identified in the environment data 160 within the field of view of the imaging means 110, for example object 930.

The method 200 comprises a step 250 of outputting a signal indicative of the one or more strobed lighting regions. The signal may be communicated via the one or more communication networks 180. In some embodiments, the signal may be communicated to the ICM 125. The ICM 125 may then be configured to receive the signal and the image data.

The ICM 125 may in some embodiments be configured to apply an image correction operation for mitigating image flicker to the one or more indicated image regions of interest and to determine the display data 150. The image correction operation performed by the ICM 125 may then be targeted to the regions of interest. Selectively applying the image operation only to the regions of interest rather than to the entire image data 140 decreases the total amount of data to be processed, focussing the image correction operation to regions most likely to be experiencing image flicker. Thus, by reducing superfluous processing, efficiency of the image correction operation applied is increased.

Embodiments of the present invention relate to a system and method for mitigating image flicker from strobed lighting systems, as will be explained with reference to FIGS. 3 and 4. The method 200 may be performed in conjunction with the method illustrated in FIG. 4, however the invention is not limited in this way. The method 200 may be performed independently to determine regions of interest, for use in any appropriate flicker mitigation algorithm.

According to some embodiments of the present invention, elements of the imaging system 100 are configured to mitigate light emitter flicker in image data, for example in the image data 140. FIG. 3 illustrates an example imaging system 300 configured to mitigate image flicker from strobed lighting systems according to some embodiments of the present invention.

Figure 3:
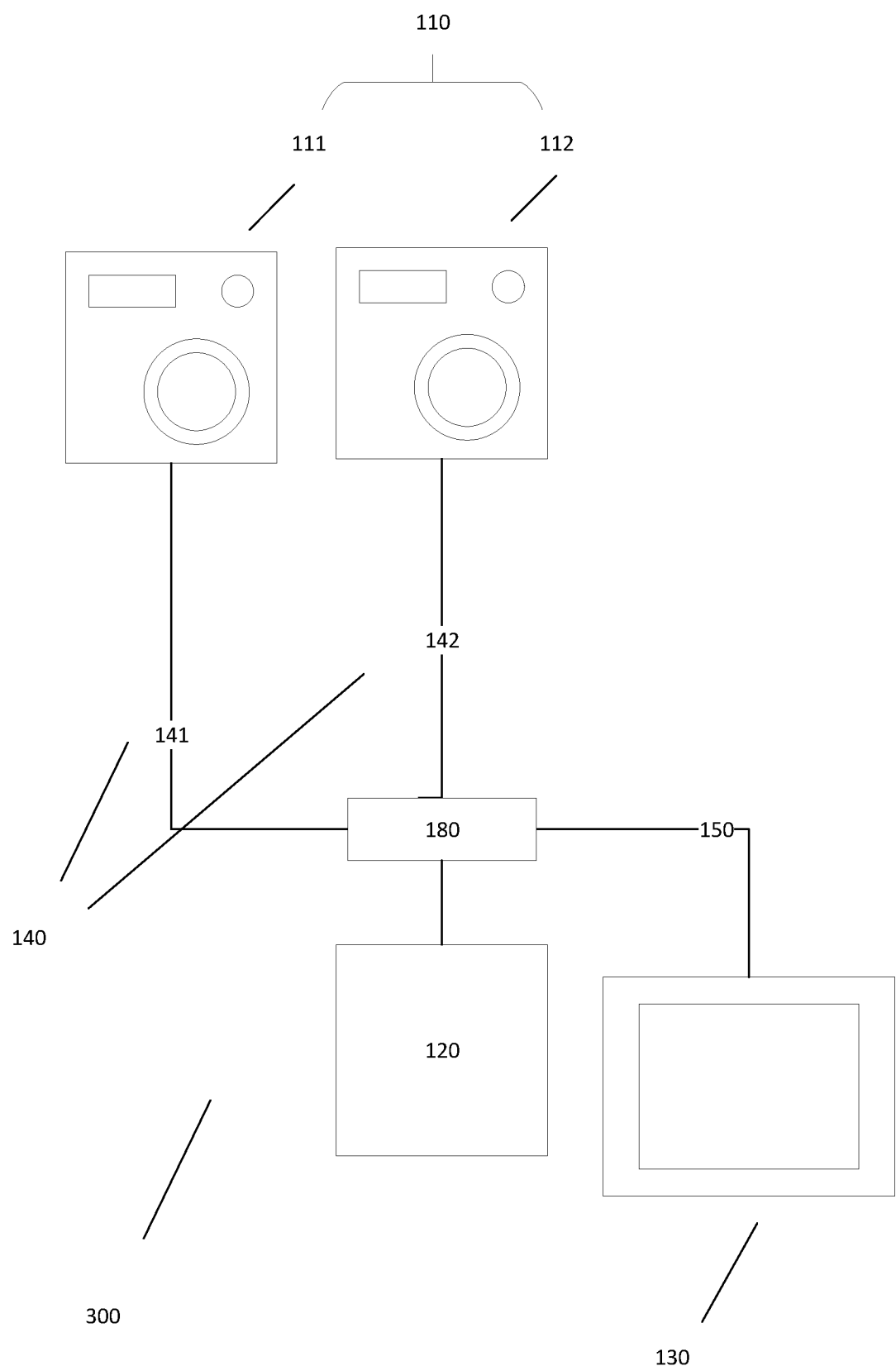
FIG. 3 shows a schematic diagram illustrating an imaging system according to another embodiment of the invention.

The imaging system 300 illustrated in FIG. 3 is an example of the imaging system 100 and comprises analogous components to the imaging system 100. The imaging system 300 may comprise all features of the imaging system 100 according to some embodiments of the invention, and may be configured to perform the method 200. As has been described with reference to FIG. 1, the imaging system 300 is configured to generate image data 140, process the image data 140 and generate display data 150. Analogous reference numerals have been used in FIG. 3 to illustrate analogous components to the imaging system 100. Detailed description of analogous components will be omitted. In the imaging system 300, the imaging means 110 comprises at least a first imaging device 111 and a second imaging device 112. The first imaging device 111 is configured to generate first image data 141 and the second imaging device 112 is configured to generate the second image data 142.

The first imaging device 111 and the second imaging device 112 may each comprise one or more cameras associated with the vehicle configured to generate image data 141, 142 indicative of the environment proximal to the vehicle. The image data may be indicative of at least a portion of the environment within a line of sight of the vehicle. The first imaging device 111 may comprise a camera configured to generate footage for display to a user of the vehicle. In some embodiments, the imaging system 300 may comprise a rear view system of the vehicle. The first imaging device 111 may comprise a rear view camera of the vehicle, and the first image data generated may be indicative of an environment substantially rear with respect to the vehicle. The display device 130 may comprise a mirror replacement display, for example a rear view mirror replacement display or a door mirror replacement display. The imaging system 300 may therefore comprise a rear view mirror or door mirror replacement system. In some embodiments, the second imaging device 112 may be associated with an existing vehicle system. That is, the second imaging device 112 may be utilised in one or more additional vehicle systems in addition to the imaging system 300. The second imaging device may be utilised for one or more additional purposes besides image correction. In this way, a specific extra dedicated camera does not need to be provided for the imaging system 300, thus reducing the cost associated with the vehicle. For example, the second imaging device 112 may be associated with a driver assistance or machine vision system such as an autonomous parking system associated with the vehicle.

The controller 120 is configured to receive the first image data 141 and second image data 142, as has been described with reference to the image data 140 of FIG. 1. The first imaging device 111 may be considered as a primary imaging device, and the first image data 141 may be substantially used to determine the display data 150. The controller 120 is configured to determine the display data 150 by mitigating image flicker of strobed lighting regions of the first image data 141. That is, the controller 120 is configured to correct or reduce light emitter flicker contained in the first image data 141 to determine the display data 150. The controller 120 is configured to correct the light emitter flicker by utilising the second image data 142, as will be explained.

As has been described with reference to FIG. 1, the communication means 122 may be arranged to communicate the display data 150 via the one or more communication networks 180. The display device 130 is configured to receive the display data 150 and to display an indication of the display data 150 to a user.

According to some embodiments of the present invention there is provided a method 400, 600 for mitigating light emitter flicker from strobed lighting systems, described herein with reference to the accompanying FIGS. 4 to 7.

Figure 4:
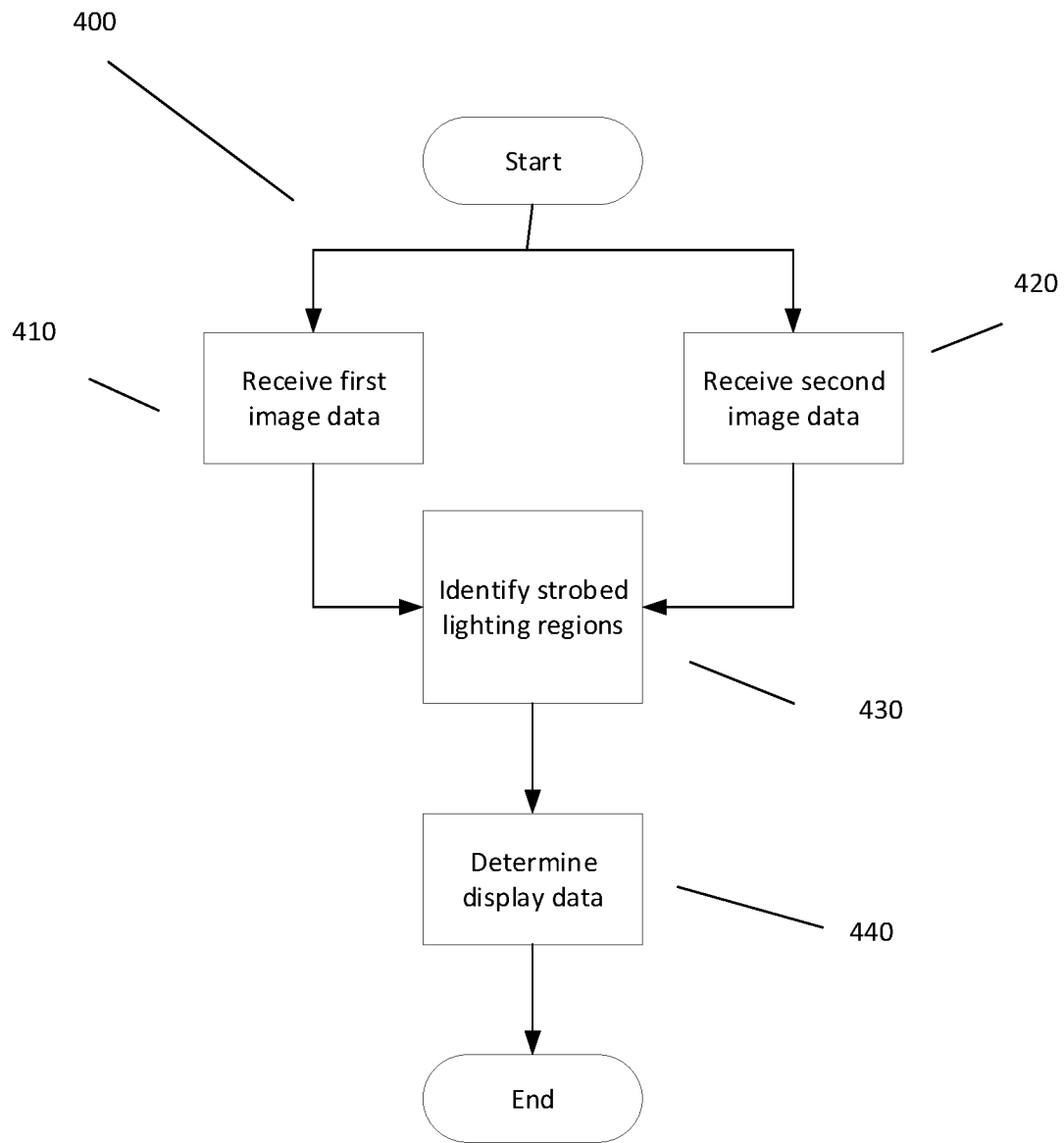
FIG. 4 shows another method for mitigating light emitter flicker from strobed lighting systems according to an embodiment of the invention.

FIG. 4 illustrates a method 400 for mitigating light emitter flicker from strobed lighting systems according to an embodiment of the present invention. The method 400 may be performed on components of the imaging system 300, in particular on the image correction module (ICM) 125 and other components of the controller 120.

The method 400 comprises a step 410 of receiving first image data 141 indicative of an environment. The first image data 141 is generated by the first imaging device 111 and received by the controller 120, for example via the communication means 122 as has been described with reference to FIG. 1. The first image data 141 may be stored in the data storage means 123 for processing by the controller 120.

The first imaging device 111 comprises a first pixel array configured to operate with at least a first exposure time to generate the first image data 141. The first image data 141 may comprise data indicative of a sequence of image frames each exposed for the first exposure time. The first exposure time may be selected appropriately considering the environment and lighting conditions. The first exposure time may be selected in dependence on optical considerations, such as a contrast or brightness desired for the first image data when displayed. In some embodiments, the first imaging device 111 may for example be a high dynamic range (HDR) imaging device and so operate at a plurality of first exposure times. Each of the plurality of first exposure times may be selected in dependence on optical considerations. The first imaging device 111 may be configured to operate at each of the plurality of first exposure times successively or simultaneously to generate each frame. For example, each pixel of the first pixel array may comprise two or more sub-pixels arranged to simultaneously operate at different exposure times, to enable spatial multiplexing of the pixel for each frame. Each pixel may be arranged to operate successively at two or more different exposure times for each frame, to enable temporal multiplexing of the pixel. At least some of the first exposure times may be selected to enhance the dynamic range of the first image data 141.

The method 400 comprises a step 420 of receiving second image data 142 indicative of at least a portion of the environment. The second image data 142 is generated by the second imaging device 112 and received by the controller 120, for example via the communication means 122 as has been described with reference to FIG. 1. The second image data 142 may be stored in the data storage means 123 for processing by the controller 120. The second imaging device 112 comprises a second pixel array configured to operate with at least a second exposure time to generate the second image data 142. The second exposure time is configured to be different to the first exposure time, i.e. the first and second image data 141, 142 are each generated with a different exposure time. In some embodiments, the second imaging device 112 may operate at a plurality of second exposure times, as has been described with relation to the first imaging device 111.

The method 400 comprises a step 430 of identifying one or more strobed lighting regions of at least one of the first image data 141 and the second image data 142. The step 430 may be performed at least in part by the image correction module (ICM) 125.

In some embodiments, the ICM 125 may be configured to identify a contrast between pixel values of corresponding regions of the first image data 141 and the second image data 142. Corresponding regions may be determined from correspondence data indicative of a predefined correspondence stored in the data storage means 123.

Figure 10:
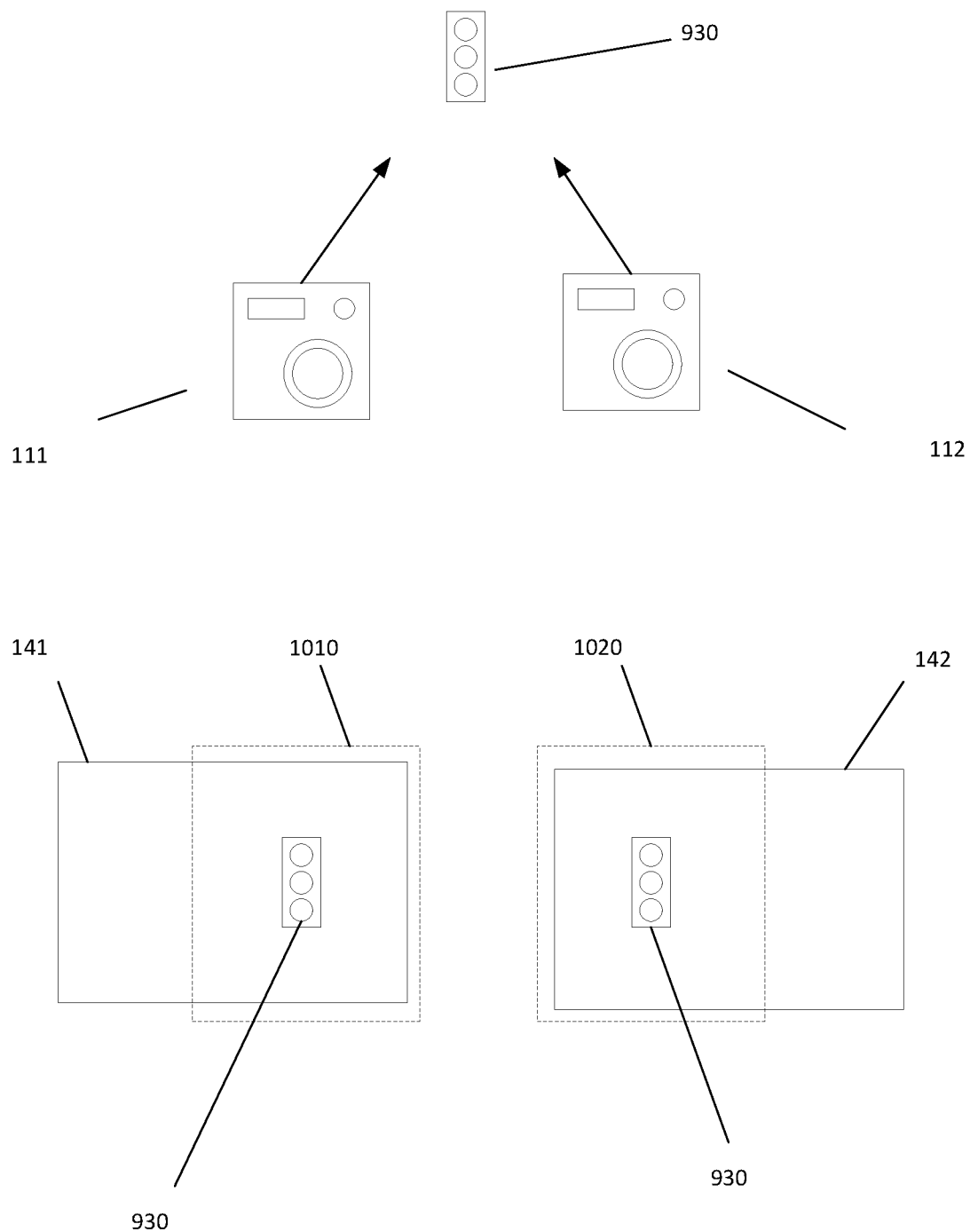
FIG. 10 shows an illustration of a correspondence between first and second image data according to an embodiment of the invention.

FIG. 10 illustrates an example correspondence between the first image data 141 and the second image data 142. The correspondence may be defined by the relative configuration of the first imaging device 111 and the second imaging device 112. As illustrated in FIG. 10A, the first imaging device 111 and the second imaging device 112 may be separated by a displacement or difference in orientation, and thus configured to capture different portions of the environment which may be overlapping. The correspondence defines a relationship between pixels of the first image data 141 and the second image data 142, i.e. regions 1010, 1020 of the first and second image data each indicative of the same portion of the environment. The corresponding regions 1010, 1020 may each comprise an indication of the same object 930. In some embodiments, the correspondence may not be predefined and so the ICM 125 may be configured to determine the correspondence. For example, the ICM 125 may compare the first image data 141 and the second image data 142 to determine the correspondence. The correspondence may be defined as a displacement or translation between pixels of the first image data 141 and the second image data 142.

The ICM 125 may be configured to identify contrasting pixels. Contrasting pixels may be defined as pixel values of the first image data 141 that exhibit a contrast with the corresponding pixels of the second image data 142. Contrast may be defined as a difference in value generated between the two corresponding pixels at some point in the image data 140. For example, the difference in value may comprise a difference in RGB value between the two corresponding pixels. The contrast may indicate the presence of a strobed light emitter in the portion of the environment corresponding to the pixels. As the first image data 141 and the second image data 142 are generated with different exposure times as has been described, the presence of the contrast in one or more frames may indicate only one of the first and second imaging device has captured the strobed light emitter in an 'on' state.

FIG. 5 illustrates a contrast between two corresponding pixels, with reference to an example strobed light emitter which may be captured by the first and second imaging devices 111, 112.

FIG. 5A illustrates example strobe data 510 representative of the temporal sequence of a strobed light emitter having a strobe rate 511. The strobe data 510 illustrates the strobed light emitter temporally fluctuating between an on state 512 and an off state 513 at time intervals indicated by the strobe rate 511. The strobed light emitter may only emit light of a predefined frequency profile when in the on state 512. If a camera captures a frame including the strobed light emitter, the light emitted will only be observed in the frame if the strobed light emitter is in the on state 512 during the exposure time of the frame captured by the camera.

FIG. 5B illustrates a portion of example first image data 520 associated with a single pixel corresponding to the strobed light emitter. The portion 520 illustrates three example frames each generated with an exposure time 521 by the first imaging device. Two example frames 522, 524 capture the strobed light emitter during an on state 512 and thus have a desired pixel value, and one example frame 523 does not capture the strobed light emitter during the on state 512.

FIG. 5C illustrates a portion of example second image data 530 associated with a corresponding single pixel of the second image data. The portion 530 illustrates ten example frames each generated with an exposure time 531 by the second imaging device over the same time period as the portion of first image data 520. Five example frames 533 capture the strobed light emitter during an on state 512 and thus have a desired pixel value, and five example frames 532 do not capture the strobed light emitter during an on state 512.

At a single time point e.g. time T as illustrated in FIG. 5, observing the first image data 520 at time T in isolation it may not be possible to determine whether the pixel contains a strobed light emitter, and if so whether the strobed light emitter has been captured in the on state 512. The ICM 125 may be configured to identify a contrast between the portions of first image data 520 and second image data 530 associated with corresponding pixels by determining whether the frames captured at a same time point T exhibit a contrast in pixel value as illustrated by FIG. 5.

The ICM 125 may then be configured to identify contrasting pixels as pixel values of the first image data 141 that exhibit a contrast with the corresponding pixels of the second image data 142.

Step 430 may then comprise defining the one or more strobed lighting regions of the first image data 141 as one or more regions comprising contrasting pixels. The one or more strobed lighting regions of the second image data 142 may be defined as the corresponding regions to the strobed lighting regions of the first image data 141.

The method 400 comprises a step 440 of determining the display data 150. The step 440 comprises determining corrected image data for the identified strobed lighting regions of the first image data 141, and adjusting the strobed lighting regions of the first image data 141 to indicate the corrected image data.

Step 440 may comprise determining a corrected pixel value for each pixel of the strobed lighting regions of the first image data 141. In some embodiments, the corrected pixel value may be determined in dependence on the contrast identified in step 420. For the example pixel illustrated by FIG. 5, the corrected pixel value may be selected as one of the contrasting values corresponding to frames 522 and 532. In some embodiments, the corrected pixel value may be selected as some combination of the contrasting values, for example an average of the contrasting values. Determining the corrected image data may comprise adjusting each pixel of the strobed lighting regions of the first image data 141 to maintain the corrected pixel value. Thus each strobed lighting region in the display data 150 is configured to maintain its respective corrected pixel value.

Advantageously, the corrected values may be determined for the first image data 141 without the need to adjust an exposure time of the first imaging device 111 to account for the strobe rate of the strobed light emitter. Thus, each exposure time of the first imaging device 111 may be utilised to provide high dynamic range, so dynamic range and image quality of the display data 150 may not be affected by performing the method 400.

Method 400 thus provides a method for determining display data 150 comprising the first image data 141 with regions of image flicker corrected to maintain a desired value. The ICM 125 may be configured to output a signal indicative of the display data 150, for example to the display device 130. The display device 130 may be configured to receive the display data 150 and to display an indication of the display data 150. Advantageously, the method 400 enables the display data 150 to be determined in real-time. Thus the display device 130 may display the display data 150 in real-time as the first image data 141 is received by the controller 120.

According to some embodiments of the present invention, some elements of the method for mitigating light emitter flicker are performed solely on the second image data 142. According to these embodiments, the second imaging device 112 may be utilised for mitigating the light emitted flicker in the strobed lighting regions. The corrected image data for the strobed lighting regions may be determined from the second image data 142, and combined with the first image data 141 to determine the display data. In this way the first imaging device 111 may be configured in consideration of the dynamic range and image quality of the display data 150, and the second imagine device 112 may be dedicated to determining corrected image data for the strobed lighting regions.

Figure 6:
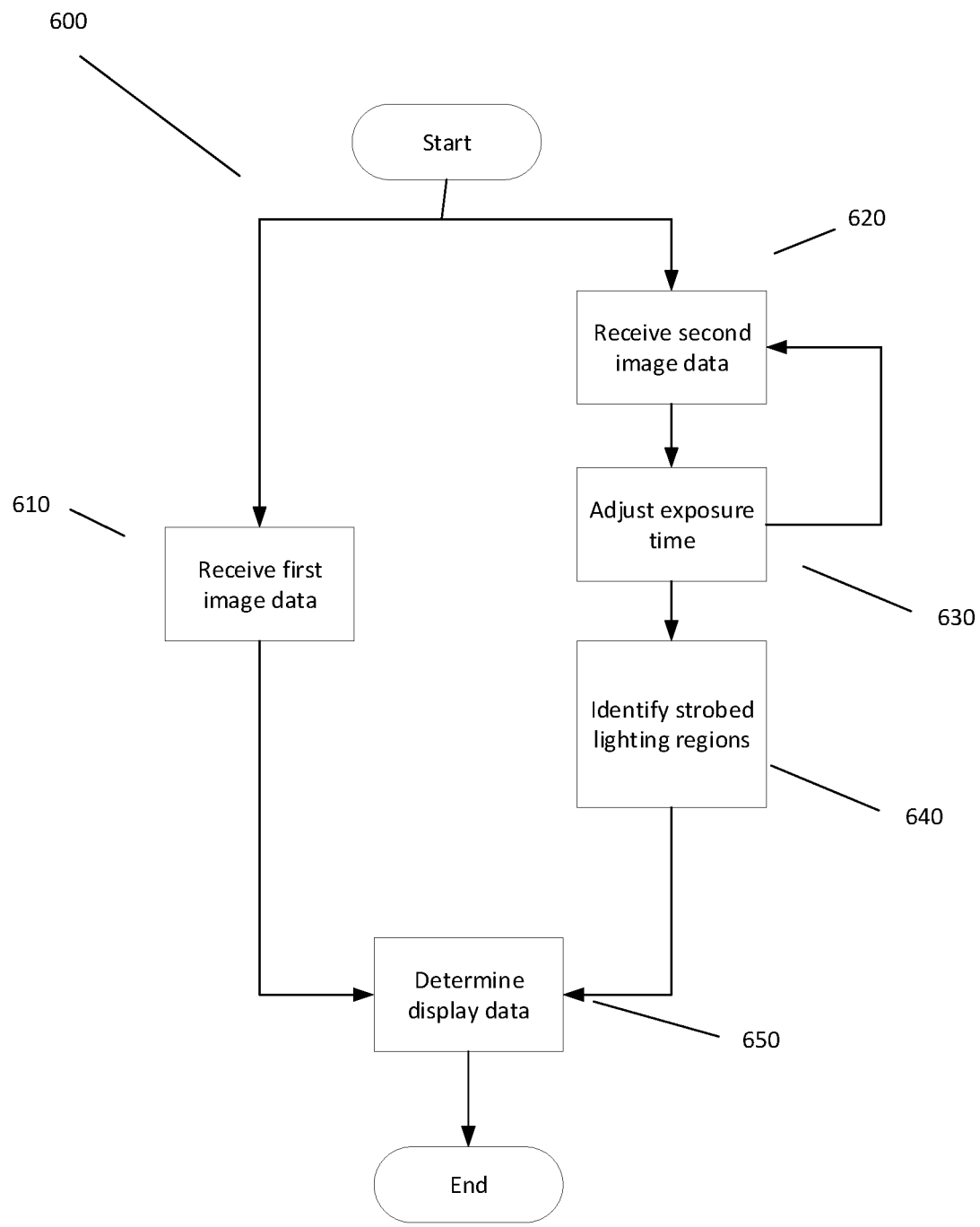
FIG. 6 shows another method for mitigating light emitter flicker from strobed lighting systems according to an embodiment of the invention.

FIG. 6 illustrates an example of a method 600 for mitigating light emitter flicker from strobed lighting systems according to some embodiments of the present invention. The method 600 may be performed on components of the imaging system 300, in particular on the image correction module (ICM) 125 and other components of the controller 120.

The method 600 comprises a step 610 of receiving first image data 141 and a step 620 of receiving second image data 142. These steps may be performed analogously to steps 410 and 420 and thus a repeat description will be omitted.

The method 600 comprises a step 630 of adjusting an exposure time of the second imaging device 112. At least one of the exposure times of the second imaging device may be adjusted to at least a third exposure time. The ICM 125 may determine an adjusted exposure time for the second imaging device 112, and transmit the adjusted exposure time via a communication channel 180 as illustrated in FIG. 3. The adjusted exposure time may be selected from a predetermined list stored in a location accessible by the ICM 125, for example the data storage means 123. For example, the adjusted exposure time may be incrementally increased or decreased from the second exposure time. The ICM 125 is configured to continue to receive the second image data 142 after the exposure time has been adjusted.

Step 630 may be performed a plurality of times, adjusting at least one exposure time of the second imaging device 112 to a plurality of values. Thus, the second image data 142 may be generated at a plurality of exposure times and stored by the data storage means 123 as has been explained.

Figure 7A:
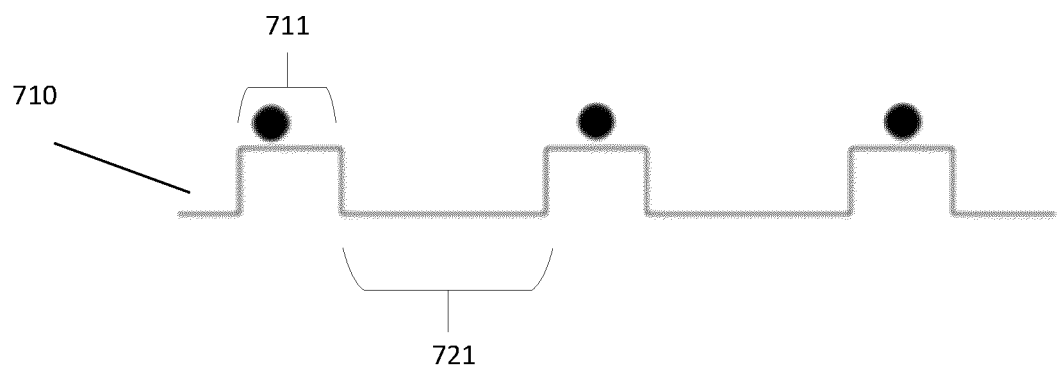
FIG. 7 shows an illustration of adjustment to an exposure time according to an embodiment of the invention.
Figure 7B:
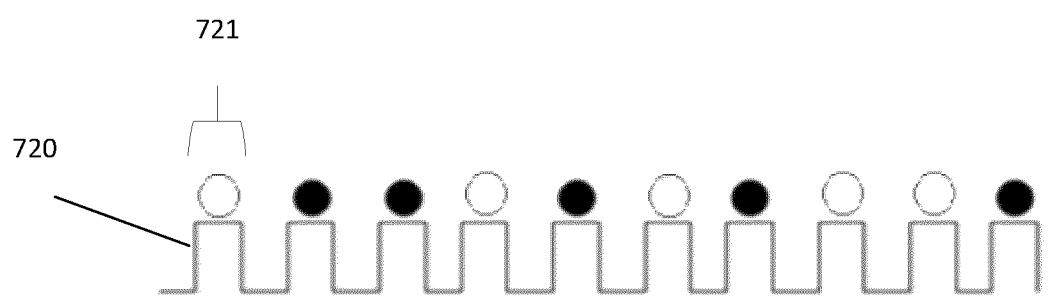

The method 600 comprises a step 640 of identifying strobed lighting regions in the second image data 142. At least a part of the step 640 may be performed analogously to the step 430. However, in step 640 the contrast may be identified between pixels of the second image data 142 generated at the second and third exposure times, rather than between the first image data 141 and the second image data 142. FIG. 7 illustrates an example of a first portion 710 of the second image data generated at the second exposure time 711, and a second portion 720 of the second image data generated at the third exposure time 721. The first portion 710 does not exhibit image flicker as illustrated, however adjusting the exposure time illustrates the contrast and allows the strobed lighting region to be identified.

The step 640 may comprise determining a strobe rate of the strobed lighting region. The strobe rate may be determined in dependence on the second image data 142. In some embodiments, the ICM 125 may be configured to identify a portion of the second image data 142 not exhibiting image flicker. The ICM 125 may then be configured to approximate or determine a strobe rate of the strobed lighting region in dependence thereon. For example, if the portion of the second image data 142 taken at the second exposure time 711 does not exhibit image flicker, the ICM 125 may infer that the strobe rate of the strobe lighting region is aligned or proportional to a refresh rate 721 of the portion 710.

The step 640 may further comprise communicating an indication of the determined strobe rate to the second imaging device 112. The second imaging device 112 may be configured to adjust at least one exposure time of the second image data 142 to align with the strobe rate. That is, at least one exposure time of the second image data 142 may be adjusted to ensure an on state 512 of the strobed light emitter is captured by the second imaging device 112 in each frame. This may in some embodiments be ensured by adjusting the exposure time of the second imaging device 112 to be equal to or larger than the determined strobe rate.

The method 600 comprises continuing to receive the second image data 142 after the exposure time of the second imaging device has been adjusted to align with the strobe rate. Consequently the second image data 142 received subsequently to performing step 640 will not exhibit image flicker within the strobed lighting regions.

The method 600 comprises a step 650 of determining the display data 150. The step 650 comprises determining corrected image data for the corresponding identified strobed lighting regions of the first image data 141, and adjusting the strobed lighting regions of the first image data 141 to indicate the corrected image data. Step 650 may comprise utilising the strobed lighting regions of the second image data 142 as the corrected image data. That is, step 650 may comprise determining the display data 150 by substituting at least some of the strobed lighting regions of the first image data with the corresponding strobed lighting regions of the second image data 142.

Advantageously, the corrected values are determined for the first image data 141 without the need to adjust an exposure time of the first imaging device 111 to account for the strobe rate of the strobed light emitter. The adjustment to account for the strobe rate is performed to the imaging device 112, and the second image data 142 received after the adjustment may be used to substitute in affected areas of the first image data 141. Thus, dynamic range and image quality of the first image data 141 are preserved.

Figure 8:
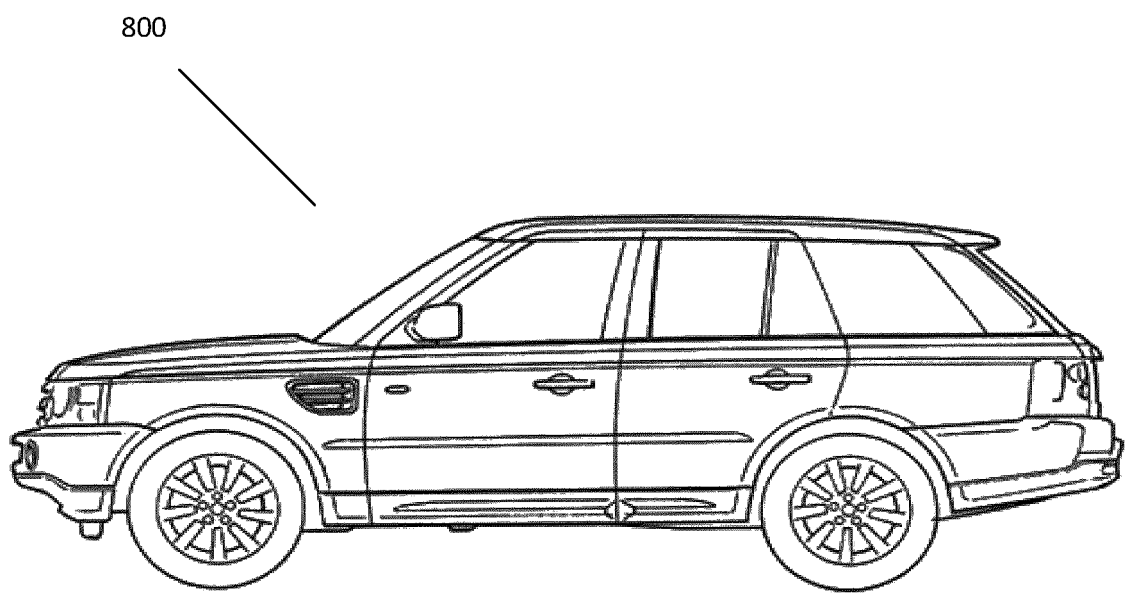
FIG. 8 shows a vehicle according to an embodiment of the invention.

FIG. 8 illustrates a vehicle 800 according to an embodiment of the invention. The vehicle 800 comprises an imaging system 100, 300 according to an embodiment of the invention as described above.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

It will be appreciated that various changes and modifications can be made to the present invention without departing from the scope of the present application.

The following numbered clauses define various further aspects and features of the present technique:

1. A system for identifying light emitter flicker, the system comprising one or more controllers, the one or more controllers comprising:
   input means configured to receive environment data indicative of objects in an environment and to receive, from one or more imaging devices, image data indicative of at least a portion of the environment;
   processing means configured to identify, in dependence on the environment data, one or more of the objects as illumination objects associated with a strobed lighting system, and to determine one or more strobed lighting regions of the image data corresponding to the one or more illumination objects; and
   output means configured to output a signal indicative of the one or more strobed lighting regions.
2. The system of clause 1, comprising an image correction controller configured to:
   receive the image data and the signal indicative of the one or more strobed lighting regions;
   apply an image correction operation for mitigating image flicker to the one or more strobed lighting regions of the image data to determine corrected image data; and
   output a signal indicative of the corrected image data.
3. The system of clause 1 or 2, comprising a display device configured to receive the corrected image data and to display an indication of the corrected image data.
4. The system of any preceding clause, wherein the system is associated with a vehicle, and wherein the environment data is indicative of objects in the environment proximal to the vehicle.
5. The system of clause 4, wherein the one or more imaging devices comprise one or more cameras associated with the vehicle.
6. The system of clause 4 or 5, wherein the environment data is indicative of data received from one or more sensors associated with the vehicle.
7. The system of clause 6, wherein the sensors comprise one or more of: a lidar sensor associated with the vehicle, a radar sensor associated with the vehicle, a sensor associated with a Park Distance Control system of the vehicle, and a camera associated with the vehicle.
8. The system of any preceding clause, wherein the environment data comprises map data indicative of one or more navigable paths in the environment.
9. The system of clause 8, wherein the map data is indicative of one or more strobed light emitters in the environment.
10. The system of clause 9, wherein the one or more strobed light emitters comprise signage associated with at least some of the navigable paths.
11. The system of any preceding clause, wherein:
    the input means comprises one or more electrical inputs for receiving the environment data and image data;
    the processing means comprises one or more electronic processors; and the output means comprises one or more electrical outputs for outputting the signal.
12. A vehicle comprising a system for identifying light emitter flicker according to any one of the preceding clauses.
13. A computer-implemented method for identifying light emitter flicker, the method comprising:
receiving environment data indicative of objects in an environment;
identifying, in dependence on the environment data, one or more of the objects as illumination objects associated with a strobed lighting system;
receiving image data indicative of at least a portion of the environment;
determining one or more strobed lighting regions of the image data corresponding to the one or more illumination objects; and
outputting a signal indicative of the one or more strobed lighting regions.
14. The method of clause 13, comprising:
applying an image correction operation to the one or more strobed lighting regions to determine corrected image data; and
outputting a signal indicative of the corrected image data.
15. The method of clause 13 or 14, comprising displaying an indication of the corrected image data.
16. A non-transitory computer readable medium comprising computer readable instruction that, when executed by a processor, cause performance of the method of any of clauses 13 to 15.

The invention claimed is:

1. An image correction system for mitigating image flicker from strobed lighting systems, the image correction system comprising one or more controllers, the one or more controllers comprising:
input means configured to receive, from a first imaging apparatus comprising a first pixel array configured to operate with at least a first exposure time, first image data indicative of an environment;
the input means configured to receive, from a second imaging apparatus comprising a second pixel array configured to operate with at least a second exposure time different to the first exposure time and configured to adjust the exposure time of the second pixel array to at least a third exposure time, second image data indicative of at least a portion of the environment at each of the second and third exposure times;
processing means configured to identify a contrast between pixel values of corresponding regions of the second image data generated at the second and third exposure times, and to identify strobed lighting regions of the first image data and strobed lighting regions of the second image data in dependence on the identified contrast;
the processing means configured to determine corrected image data for mitigating image flicker of the strobed lighting regions of the first image data in dependence on a correspondence between the strobed lighting regions of the first image data and the strobed lighting regions of the second image data; and
output means configured to output a signal indicative of the corrected image data.
2. An image correction system according to claim 1, comprising a display device configured to receive the signal indicative of the corrected image data and to display an indication of the signal.
3. An image correction system according to claim 2, wherein the processing means is arranged to determine the corrected image data in real-time.
4. An image correction system according to claim 1, comprising:
the first imaging apparatus comprising the first pixel array configured to generate the first image data; and
the second imaging apparatus comprising the second pixel array configured to generate the second image data.
5. An image correction system according to claim 1, wherein the one or more controllers are configured to determine a strobe rate of the strobed lighting region.
6. An image correction system according to claim 5, wherein:
the one or more controllers are configured to communicate an indication of the strobe rate to the second imaging apparatus, and to control the second imaging apparatus to adjust at least one of the second or third exposure time to align with the strobe rate; and
the second imaging apparatus is configured to communicate the second image data generated at the at least one adjusted exposure time to the one or more controllers and optionally wherein the one or more controllers are configured to determine the corrected image data by substituting at least some of the strobed lighting regions of the first image data with the corresponding strobed lighting regions of the second image data.
7. An image correction system according to claim 1, wherein the one or more controllers are configured to identify a contrast between pixel values of corresponding regions of the first image data and the second image data, and to identify the strobed lighting regions in dependence thereon.
8. An image correction system according to claim 7, wherein the one or more controllers are configured to determine a corrected pixel value for each of the strobed lighting regions in dependence on the identified contrast.
9. An image correction system according to claim 8, wherein the one or more controllers are configured to determine the corrected image data by adjusting each strobed lighting region of the first image data to maintain the corrected pixel value.
10. An image correction system according to claim 1, wherein the image correction system is associated with a vehicle, and wherein the first image data and second image data are indicative of objects in the environment proximal to the vehicle.
11. An image correction system according to claim 10, wherein the first imaging apparatus and the second imaging apparatus each comprise one or more cameras associated with the vehicle.
12. An image correction system according to claim 11, wherein the first imaging apparatus is associated with a rear view system of the vehicle.
13. An image correction system according to claim 12 comprising a display device configured to receive the signal indicative of the corrected image data and to display an indication of the signal.
14. An image correction system according to claim 13, wherein the processing means is arranged to determine the corrected image data in real-time, wherein the display device comprises a rear view mirror replacement system or a door mirror replacement system.
15. An image correction system according to claim 11, wherein the second imaging apparatus is associated with an existing vehicle system and is arranged to be utilised for one or more additional purposes besides image correction.

16. A vehicle comprising an image correction system according to claim 1.

17. An image correction method for mitigating image flicker from strobed lighting systems, the image correction method comprising:
- receiving first image data indicative of an environment taken with at least a first exposure time;
- receiving second image data indicative of at least a portion of the environment taken with each of a second exposure time different to the first exposure time and a third exposure time;
- identifying a contrast between pixel values of corresponding regions of the second image data generated at the second and third exposure times;
- identifying strobed lighting regions of the first image data and the second image data in dependence on the identified contrast between pixel values of the second image data;
- determining corrected image data for mitigating image flicker of the strobed lighting regions of the first image data in dependence on a correspondence between the strobed lighting regions of the first image data and the strobed lighting regions of the second image data; and
- outputting a signal indicative of the corrected image data.

18. A non-transitory computer readable medium comprising computer readable instruction that, when executed by a processor, cause performance of the method of claim 17.

* * * * *